M. B. LLOYD.
FOLDABLE GO-CART.
APPLICATION FILED APR. 13, 1912.

1,124,155.

Patented Jan. 5, 1915.
2 SHEETS—SHEET 1.

Witnesses:
Frank W. Bemm
Robert S. McCreadie

Inventor:—
Marshall B. Lloyd
By
Atty

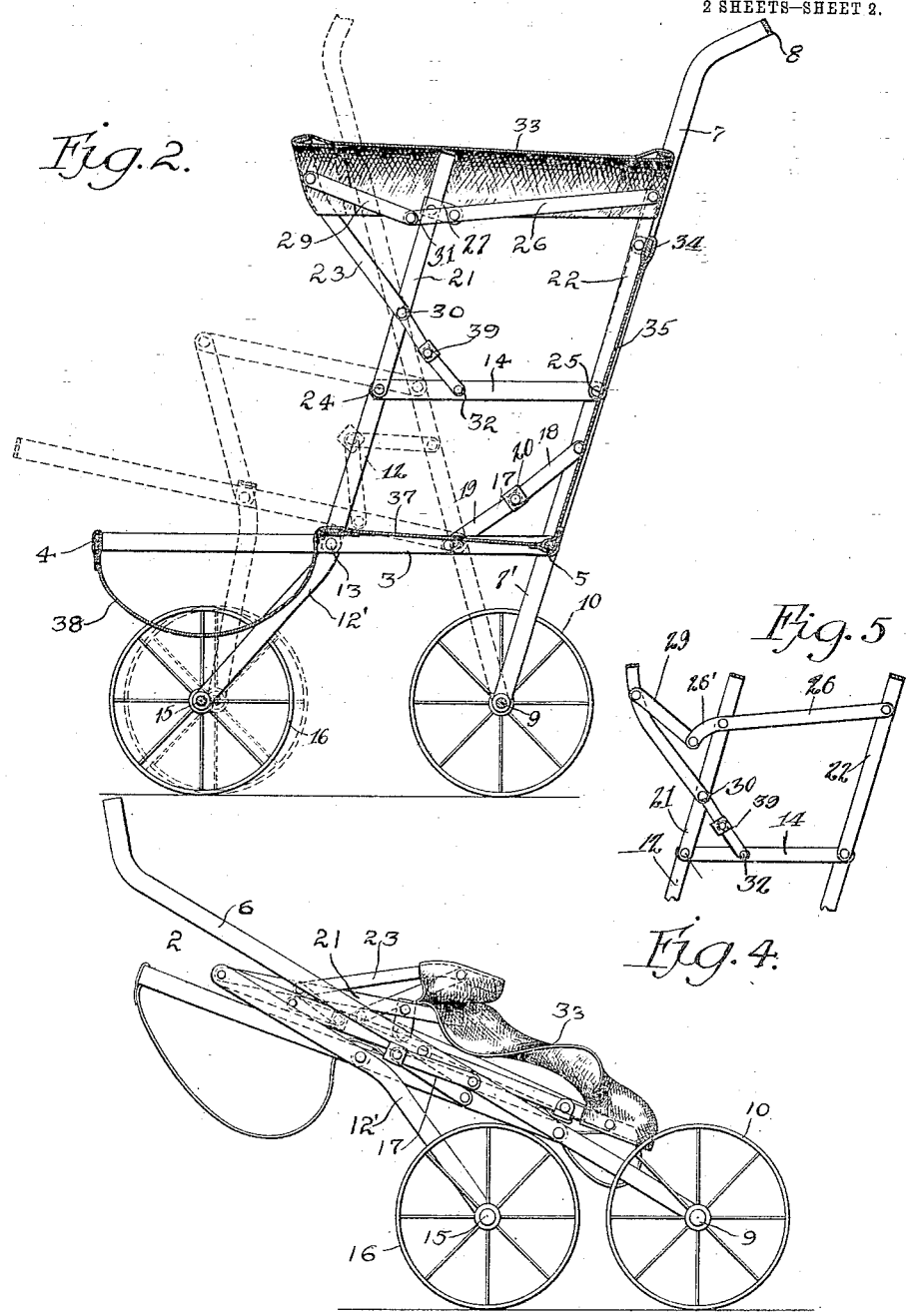

UNITED STATES PATENT OFFICE.

MARSHALL BURNS LLOYD, OF MENOMINEE, MICHIGAN, ASSIGNOR TO THE LLOYD MANUFACTURING COMPANY, OF MENOMINEE, MICHIGAN, A CORPORATION OF MICHIGAN.

FOLDABLE GO-CART.

1,124,155.      Specification of Letters Patent.      Patented Jan. 5, 1915.

Application filed April 13, 1912. Serial No. 690,484.

*To all whom it may concern:*

Be it known that I, MARSHALL B. LLOYD, a citizen of the United States, and resident of Menominee, county of Menominee and State of Michigan, have invented certain new and useful Improvements in Foldable Go-Carts, of which the following is a specification.

My invention relates to improvements in go-carts of the kind which are made up of pivotally connected members that are adapted to be collapsed or folded into a compact parcel without disconnecting or removing any such parts.

The object of my invention is to provide a foldable or collapsible go-cart which shall be characterized by a main frame and a handle or pusher which are pivotally connected and by the single closing movement of which the several parts of the go-cart may be collapsed or folded.

A further object of my invention is to provide a go-cart of the class mentioned which shall be composed of a minimum number of parts, all so formed as to permit them to be made and assembled at a low cost.

A still further object of the invention is to provide a go-cart which shall be of minimum weight and yet strong enough to withstand the rough usage and shocks to which go-carts are subjected.

My invention consists generally in a go-cart of the construction and combination of parts hereinafter described and particularly pointed out in the claims.

My invention particularly resides in special features of simplification whereby the main frame, seat and foot well are economically formed and supported upon the wheels, whereby a long wheel base is secured at minimum cost, whereby a two position seat back is secured without addition to the number of parts necessary to form the remainder of the cart and whereby a simple and easily operated canopy is provided in conjunction with the body of the cart and said seat back.

Figure 1:
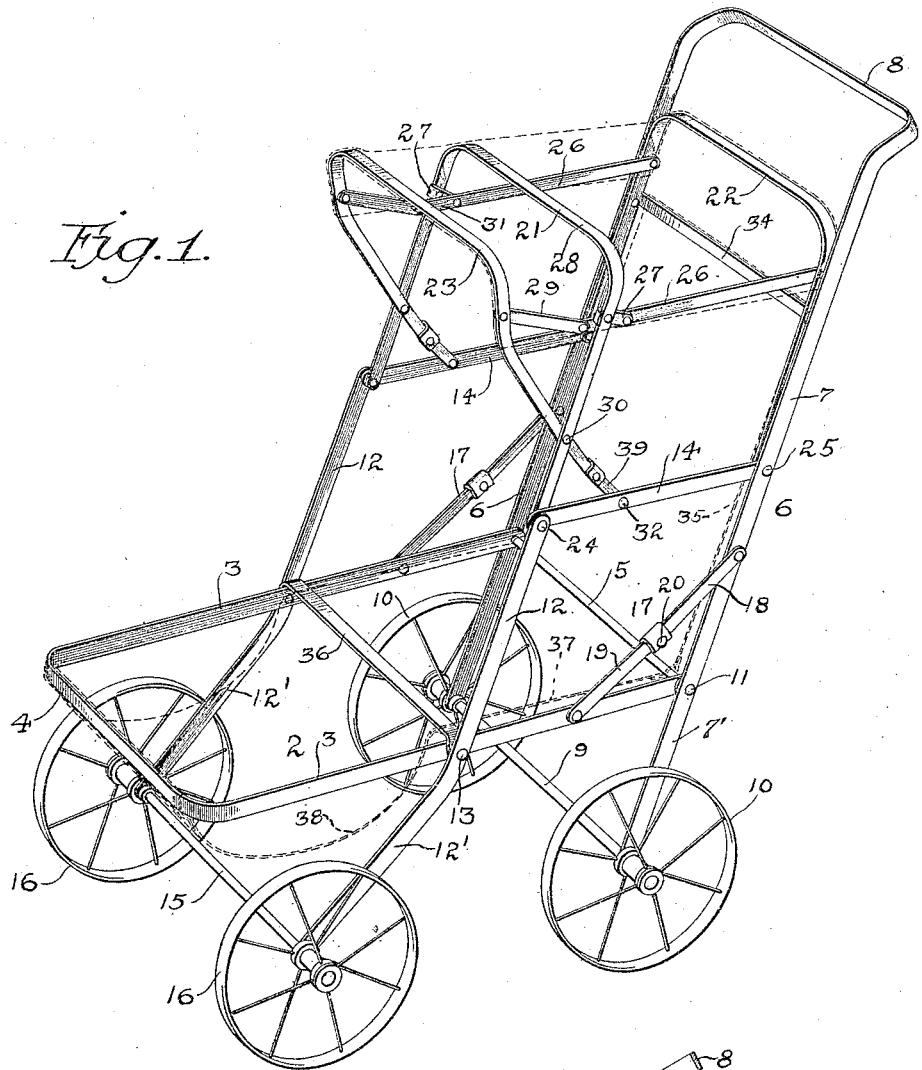
Figure 3:
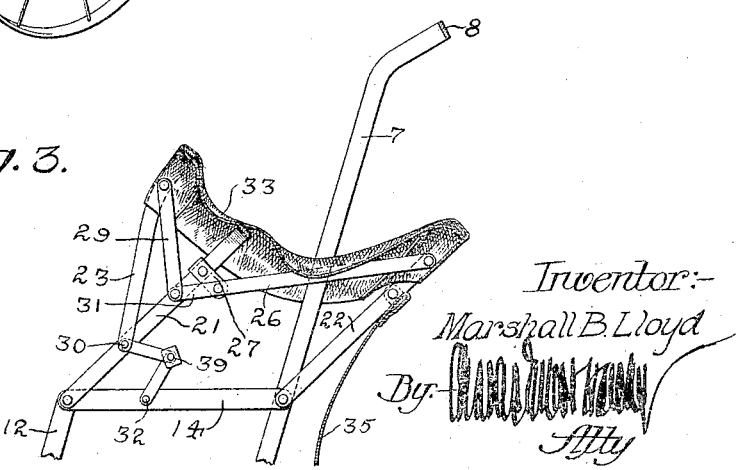

My invention will be more readily understood by reference to the accompanying drawings forming a part of this specification and in which:

Figure 1 is a perspective view of a go-cart embodying my invention, the flexible portions thereof being indicated by means of dotted outlines; Fig. 2 is a vertical longitudinal section of the go-cart. The dotted lines showing the frame work in partly collapsible or folded condition; Fig. 3 is a similar sectional view showing the hood or canopy in partly folded condition; Fig. 4 is a side elevation of the cart in completely folded or collapsed condition; and Fig. 5 illustrates a modification of the actuating links of the hood.

My invention is capable of embodiment in carts for different uses, such as doll-carts and children's go-carts, and I have chosen to show it in the form of a simple toy or doll go-cart.

It should be understood that my invention is here shown in its simplest form. Various styles thereof may be made, the making of each style involving slight mechanical modifications which will readily suggest themselves to one who is skilled in the art.

A rectangular elongated main frame 2 contains or is occupied by a seat 37 and a foot well 38. A handle or pusher 6 is pivoted on the rear end of the frame and is adapted to be folded forward onto the main frame. Side arms 14 have their rear ends pivoted to the handle or pusher. Their forward ends are supported by side bars 12 preferably parallel with the handle or pusher and pivotally joining the forward ends of the arms 14 to the intermediate part of the main frame. Toggle lever locks 17 may be used for securing the main frame and handle or pusher in distended condition. Downward extensions 12' of the side bars 12 are attached to a front axle 15. Downward extension 7' of the handle or pusher are attached to the rear axle 9. The front and rear axles are equipped with wheels 16 and 10 respectively. As shown, the downward extensions of the side bars 12 and those of the handle or pusher support the main frame 2 upon the wheels and in horizontal position when the cart is distended or opened. I secure a long wheel base for the cart by forming the downward extensions 12' and 7' upon diverging lines, whereby the spread between the axles is increased over the spread between the pivotal points of the side bars and the handle on the main frame. To secure this result I prefer to bend the lower ends 12' of the side bars forward and increase their length with respect to the extension 7' whereby the front end of the main frame is supported at the same distance from the ground as the rear end thereof and whereby the front wheels are positioned beneath the foot well with their front sides substantially in the vertical plane which includes the front cross bar or end of the main frame. The hood and seat back of this go-cart are united virtually in one structure. The construction and operation of the hood will be explained in detail hereinafter and at this point it is sufficient to call attention to the fact that the rear bow 22 of the hood is equipped with a cross bar 34 which forms the top of the seat back 35. In some of my carts I omit this feature and equip the cart with an independently movable seat back which is pivoted on the rear end of the seat 37. The seat back shown is formed of flexible fabric, the lower end of the fabric being attached to the rear end of the seat 37, and the upper end being attached to the bar 34. When the hood is in raised position the back is likewise raised, as shown in Fig. 2, and when the hood is lowered the back is dropped as partly indicated in Fig. 3, allowing the occupant of the cart to recline therein.

Referring now to the details of construction:—In the cart shown the main or body frame comprises parallel side members 3—3, a front cross bar 4 formed integrally with the side bars and a rear cross bar or rod 5 which is secured to and spaces the rear ends of the side bars apart. The side bars and the front bar are formed from a flat bar or strap preferably arranged on edge, for strength and for conveniently forming connections with the other parts of the structure. The foldable handle member 6 consists of a rectangular frame having side members 7—7 and a top connecting member 8 which serves as a handle, these three parts being formed from a single thin bar of metal. The lower ends of the parts 7 are joined by a lower cross bar 9 upon the outer extending ends of which the rear pair of wheels 10 are mounted. The handle frame is pivotally mounted upon the main or body frame and is preferably secured upon the outer ends 11 of the rear cross bar 5. To complete the body structure or frame of the cart, I provide the side bars 12 which are pivotally secured to the side members 3 of the main frame at substantially their middle portions by the rivets 13. The upper ends of the side bar 12 are substantially parallel with the handles or pushers 6. I pivotally connect the upper ends of the side bars 12 to the handle frame by means of horizontal link bars 14 whereby the side bars 12 are swung or moved upon their pivots and maintained substantially parallel with the handle member 6 in all its positions. I incline or bend forward the lower ends 12' of the side bars 12 out of parallel with the bars 7—7 and rigidly connect their lower ends by means of a cross bar 15 upon the outer extended ends of which the forward pair of wheels 16 are mounted. I incline the lower ends of the side bars 12 at a greater angle to the main frame than the relation of the handle frame bears to the main frame with the purpose of spreading the wheels far apart and thereby affording a long wheel base when the cart is opened; that is, when it is in condition for use. This construction also secured the result of causing the front and rear pairs of wheels to approach close together when the cart is folded, as clearly illustrated in Figs. 2 and 4. To maintain the handle and main frame in distended or open condition, I preferably employ a toggle link 17 on each side of the cart, arranged between the side bars of the main frame and the handle frame and pivotally connected thereto. Each of these links is formed of two members 18 and 19 hinged together by means of a pivot and stop 20; a construction which permits the toggle to pass centers with the pivots on the parts 3 and 7 and thus become a lock, to hold the several parts of the cart in extended position.

The canopy structure comprises three U-shaped frames 21, 22 and 23 which are pivotally mounted at their lower ends to the body structure and are adapted to collapse upon the body structure. The frame 21 preferably forms a pivotal extension of the side bars 12, its lower ends being connected to the bars 14 by the same pivots 24. The rear frame 22 is preferably positioned substantially between the side members of the handle frame 6 and is preferably pivoted at its lower ends to the handle member by the pivots 25 which connect the rear ends of the horizontal bars 14 with the handle frame. The upper ends of the frames 21 and 22 are pivotally connected together by means of horizontal link bars 26 which are pivotally connected at their rear ends directly to the side bars of the rear canopy frame 22 and at their forward ends are pivotally connected to the rear ends of lug members 27 which extend rearwardly from and are secured one on each side of the forward frame 21. This structure, as clearly indicated in Figs. 3 and 4 permits the rearward folding down of the hood frames into substantial parallel relation with the horizontal bars 14 without interference between the upper cross bar 28 of the frame 21 and the side links 26. These side links 26 extend forward beyond their pivotal connections with the frame 21 a short distance and are pivotally connected to the forward U shaped frame 23 by means of short side links 29. The forward frame 23 is hinged at its lower ends to the frame 21 somewhat above the pivots 24 by means of rivets 30 and extends forward at an inclination to form an overhanging or projecting hood. By means of this structure I am enabled to positively extend and retract the forward frame 23 in relation to the frame 21 by the raising and lowering of the canopy structure. The forwardly extending end portions 31 of the horizontal bars 26 and the links 29, which connect these bars with the frame 23, act in conjunction with the positive connection of the lower ends of the frame 23 to the frame 21, as hinged toggle levers which in the act of raising the canopy are straightened out and positively force the frame 23 to its extended position and likewise positively retract it. The canopy is maintained rigidly in its extended position by means of locking levers 39 similar to the main locking levers 17 and which are pivotally connected at their upper ends upon the pivots 30 and at their lower ends to the horizontal bars 14 by means of pivots 32. The canopy is provided with a flexible covering 33 which is connected positively to the forward frame 23 and to the rear frame 22 and when the canopy is raised and the forward frame is positively forced to its extended position the canopy is straightened to a taut condition. As shown in Fig. 5 the employment of the pivot lugs 27 on the bow 21 may be avoided by bending the ends 26' of the long links downward to provide the throw which is necessary to retract the links 29 and the bow 23.

To provide a seat and seat back of light weight and durable construction, I may employ the horizontal cross bar 34 rigidly secured to the sides of the rear frame 22 of the canopy near the upper end of the frame and secure to this bar the upper end of a flexible back member 35. This flexible member which extends from side to side of the cart is also connected to the cross bar 5 at the rear end of the main frame and thereby forms a suitable back. To form a seat I provide a cross bar 36 on the main frame 2 preferably securing it by means of the rivets 13 which pivotally mount the side bars 12 and I extend the cloth web, which forms the back, forward and support it upon this intermediate cross bar 36 securing it in such taut condition between the bars 5 and 36 that the portion therebetween forms a flexible seat member 37. This member extends from side to side of the cart and to form a foot well 38 I extend the cloth web forward fastening its forward end to the front cross bar 4. This last portion of the flexible member is made long enough to hang from the main frame and seat, in the form of a pocket as indicated in Fig. 2.

Having thus fully described my invention, I claim as new and desire to secure by Letters Patent:

1. In a foldable go-cart a rectangular main frame and a handle or pusher pivotally mounted at the rear end thereof and foldable forwardly thereupon, in combination with means for locking the frame and pusher in open position, arm members pivotally joining said frame and handle, a bowed hood mounted on said arm members, and a flexible seat back mounted upon and between said main frame and the rear bow of said hood.

2. In a folding go-cart the combination with a foldable body structure and a collapsible canopy structure mounted thereon, of a flexible seat-back connected at its upper and lower ends to the canopy and body structures respectively and adapted to be raised to upright position by the extending of the body structure and the raising of the canopy, substantially as described.

3. In a folding go-cart a main frame having a plurality of cross bars in combination with a handle frame, a hood bow, and a flexible seat and back comprising a continuous strip of flexible material connected at one end to the forward end of the main frame and at its rear end to said hood bow.

4. In a folding go-cart, a main frame, in combination with arm bars collapsible upon said main frame, two hood bows pivoted upon the forward and rear ends of said arms, a third bow pivoted at or upon the forward bow, a covering upon said bows, pivots upon said third, forward and rear bows, a long link substantially parallel with said arm and held by the pivots on the forward and rear bows, said link extending forward beyond its pivot on said forward bow, a short link connecting the forward end of said long link to the pivot on said third bow and a pivot connecting said short and long links at a point outside the line of the said pivots on the bows, substantially as described.

5. In a folding hood or canopy for go-carts, the go-cart arms, in combination with two hood bows pivoted upon the forward and rear ends of said arms, a third bow pivoted at or upon the forward bow, a covering upon said bows, pivots upon said third, forward and rear bows, a long link substantially parallel with said arm and held by the pivots on the forward and rear bows, said link extending forward beyond its pivot on said forward bow, a short link connecting the forward end of said long link to the pivot on said third bow, a pivot connecting said short and long links at a point below the pivot on said third bow, substantially as described.

6. In a folding go-cart a normally horizontal main frame in combination with a handle or pusher pivoted on the rear end of said main frame and foldable thereon, side arms, side bars pivotally joining said arms and main frame, front and rear axles operatively connected with and foldable upon said frame with said handle, arms and side bars, and a continuous web of flexible material secured at one end to the upper part of the handle or pusher and at the other end to the forward end of the main frame and serving to provide a foot-well in the forward part of the main frame, a seat in the rear portion of the main frame and a back in the handle member.

In testimony whereof, I have hereunto set my hand, this 6th day of April, 1912, in the presence of two subscribing witnesses.

MARSHALL BURNS LLOYD.

Witnesses:
 HILDA C. PETERSON,
 C. O. PORTERFIELD.

Copies of this patent may be obtained for five cents each, by addressing the "Commissioner of Patents, Washington, D. C."